United States Patent [19]

Kwak

[11] Patent Number: 5,982,454
[45] Date of Patent: Nov. 9, 1999

[54] METHOD FOR CANCELLING GHOST EFFECTS IN IMAGE SIGNAL PROCESSOR

[75] Inventor: Jeong Ho Kwak, Seoul, Rep. of Korea

[73] Assignee: LG Electronics Inc., Seoul, Rep. of Korea

[21] Appl. No.: 08/764,630

[22] Filed: Dec. 11, 1996

[30] Foreign Application Priority Data

Dec. 13, 1995 [KR] Rep. of Korea ...................... 95/49215

[51] Int. Cl.$^6$ .................................................. H04N 5/21
[52] U.S. Cl. ............................................................ 348/614
[58] Field of Search .................................... 348/614, 607;
358/167, 905, 37; 375/231, 232; 455/65;
H04N 5/21, 5/213

[56] References Cited

U.S. PATENT DOCUMENTS

| | | | |
|---|---|---|---|
| 5,111,298 | 5/1992 | Koo | 348/614 |
| 5,161,017 | 11/1992 | Sato | 348/614 |
| 5,299,004 | 3/1994 | Joo et al. | 348/614 |
| 5,311,312 | 5/1994 | Oh | 348/614 |
| 5,321,512 | 6/1994 | Huang | 348/614 |
| 5,512,959 | 4/1996 | D'Alto et al. | 348/614 |

FOREIGN PATENT DOCUMENTS 4-32373  2/1992  Japan ............................... H04N 5/21

*Primary Examiner*—David E. Harvey

[57] ABSTRACT

A method for cancelling ghost effects in an image signal processor which is capable of enhancing a convergence rate of a coefficient of a filter and a performance of cancelling ghost effects in a system, by alternately performing the updatings of the coefficients of an FIR filter and an IIR filter in a system using both the FIR filter and the IIR filter, includes initializing an FIR filter bank and an IIR filter bank, updating the FIR filter bank by performing an algorithm for updating a coefficient of a filter with a data having a ghost effect and a data in which a reference GCR data is filtered by the IIR filter, updating the IIR filter bank by performing the algorithm for updating a coefficient of a filther with the reference GCR data and a data in which an X(z) is filtered by the FIR filter bank, and obtaining an FIR filter bank and an IIR filter bank in each of which an error is minimized.

9 Claims, 3 Drawing Sheets

SYSTEM MODEL : $\dfrac{H(Z)}{I(Z)}$

METHOD FOR CANCELLING GHOST EFFECTS IN IMAGE SIGNAL PROCESSOR

BACKGROUND OF THE INVENTION

1. Field of the Invention

The present invention relates to a method for cancelling ghost effects in an image signal processor, and in particular, to an improved method for cancelling ghost effects in an image signal processor which is capable of enhancing a performance of cancelling ghost effects in a system using a finite impulse response (hereinafter, called FIR) filter and an infinite impulse response (hereinafter, called IIR) filter.

2. Description of the Prior Art

Recently, multilateral programs for cancelling ghost effects occurring in an image signal processor like a TV set have been studied. A general method for cancelling ghost effects is that a transmitter transmits a ghost cancelling reference (hereinafter, called GCR) signal, and a receiver compares the GCR signal with the stored GCR signal. To do this, each GCR signal differently set in each country is transmitted.

FIG. 1 is a block diagram of a digital filter of a ghost effect canceler according to the conventional art, which includes an FIR filter 10 for filtering an input digital signal (Xn) in accordance with a coefficient of a filter and cancelling ghost effects, an IIR filter 9 for filtering an output from the FIR filter 10 in accordance with a coefficient of a filter and cancelling ghost effects, and an adder 12 for adding the outputs from the FIR filter 10 and the FIR filter to define the IIR filter 9.

The operation of the digital filter in a conventional ghost effect canceler having the above construction will now be described in detail.

First, when the digital signal is inputted from an analog/digital (A/D) converter (not illustrated), the FIR filter 10 cancels a ghost effect in the digital signal (Xn) by repeating filterings by predetermined times in accordance with a coefficient of a filter, and the IIR filter 9 receives an output from the FIR filter 10 and again cancels ghost effects in the digital signal by repeating filterings by predetermined times. And the output from the IIR filter 11 is converted into an analog signal in a digital/analog (D/A) converter (not illustrated).

Here, to obtain the coefficients from the FIR filter 10 and the IIR filter 11, a precise algorithm is required, and the most widely adopted one is a least mean square (hereinafter, called LMS) algorithm as shown in FIG. 2.

The LMS algorithm will now be explained.

It is assumed that if an input signal X(n) passes through an unacknowledge system 13, it becomes a GCR signal d(n) which serves as a reference signal.

Here, a subtractor 15 subtracts an output y(n) from an adaptive FIR filter 14 from the GCR signal d(n) to obtain a resultant value e(n) and feeds back the resultant value e(n) to the adaptive FIR filter 14. Here, until the output value e(n) from the subtractor 15 becomes zero (0), the adaptive FIR filter 14 performs a filtering repeatedly to obtain the best coefficient of the filter. The above procedure is the LMS algorithm.

However, since the LMS algorithm is generally used only when the coefficient of the FIR filter is updated, it cannot be adopted in the system using both the FIR filter and the IIR filter.

Further, since the digital filter of the conventional ghost effect canceler sequentially updates the FIR coefficient and the IIR coefficient, when an error occurs in updating the FIR coefficient, the update of the IIR coefficient is influenced, and as a result, a ghost effect quality is not properly cancelled from the image signal.

Moreover, since the IIR filter has a feedback construction, when the FIR coefficient is computed, long ghost effects which must be processed in a region of the IIR filter influence the coefficient, resulting in lowering a performance of cancelling the ghost effects in the system.

SUMMARY OF THE INVENTION

Accordingly, it is an object of the present invention to provide an improved method for cancelling ghost effects in an image signal processor which is capable of enhancing a convergence rate of a coefficient of a filter and a performance of cancelling ghost effects in a system, by alternately performing the updatings of the coefficients of an FIR filter and an IIR filter in a system using both the FIR filter and the IIR filter.

To achieve the above object, there is provided an improved method for cancelling ghost effects in an image signal processor which includes initializing an FIR filter bank and an IIR filter bank, updating the FIR filter bank by performing an algorithm for updating a coefficient of a filter with a data having ghost effects and a data in which the GCR data and an input signal are filtered by the FIR filter bank, updating the IIR filter bank by performing the algorithm for updating a coefficient of a filter with the reference GCR data and a data in which an input signal is filtered by the FIR filter bank, and obtaining an FIR filter bank and an IIR filter bank in each of which an error is minimized.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
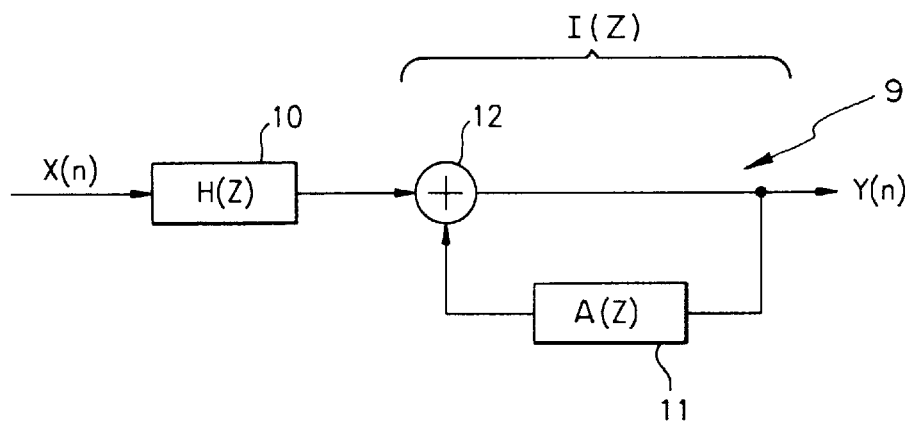
FIG. 1 is a block diagram showing a digital filter of a ghost effect canceler according to the conventional art.
Figure 2:
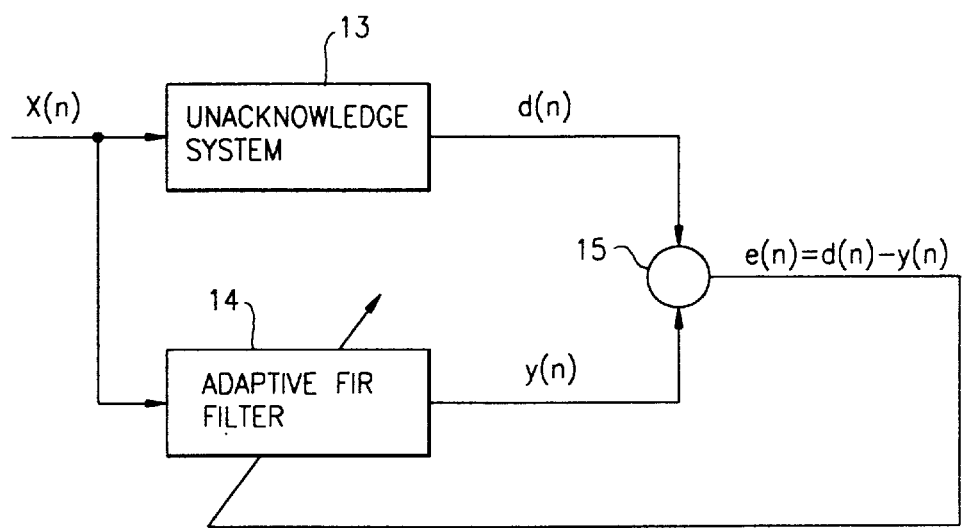
FIG. 2 is a block diagram showing an LMS algorithm for obtaining a coefficient of a filter according to the conventional art.
Figure 3A:
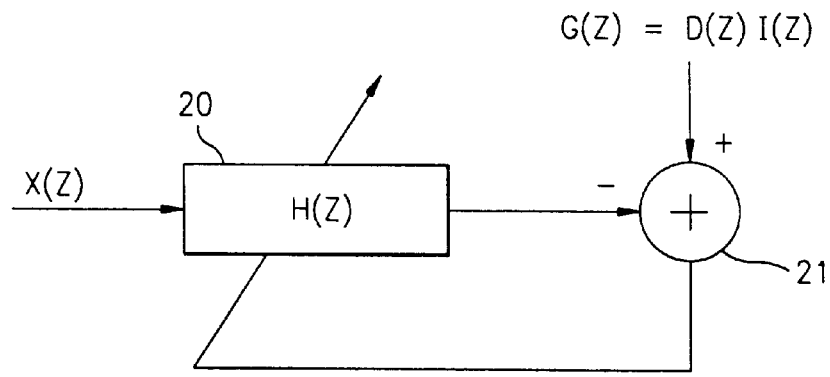
FIGS. 3A and 3B are block diagrams showing an LMS algorithm for obtaining a coefficient of a filter according to the present invention.
Figure 3B:
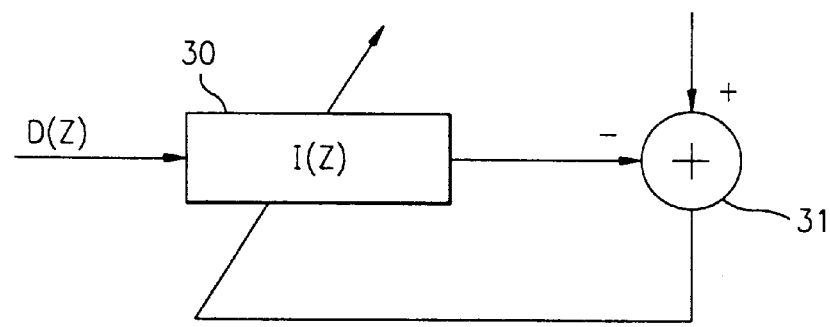

FIGS. 3A and 3B are block diagrams showing an LMS algorithm for obtaining a coefficient of a filter according to the present invention, in which the coefficients of the banks of an FIR filter 20 and an IIR filter 30 are alternately obtained through an off line by allowing the updating of the coefficients of the FIR filter 20 and the IIR filter 30 to have a feedforward construction.

The LMS algorithm will now be explained in detail with reference to the accompanying drawings.

First, if each transfer function of the FIR filter 20 and the IIR filter 30 is defined as H(z) and 1/I(z), respectively, an input signal X(z), and a GCR data which serves as a reference signal D(z), an equation $X(z)*H(z)*1/I(z)=D(z)$ ... (1) can be formed.

Here, X(z) represents an input data having a ghost effect, H(z) the FIR filter bank, I(z) the IIR filter, and D(z) a built-in reference GCR data.

Accordingly, the IIR filter I(z) has a feedforward construction of X(z)*H(z)=D(z)*I(z), not a feedback construction.

Therefore, the present invention adopts a method of reducing each error by alternately performing the updatings of the FIR filter bank and the IIR filter bank through the off line.

Figure 4:
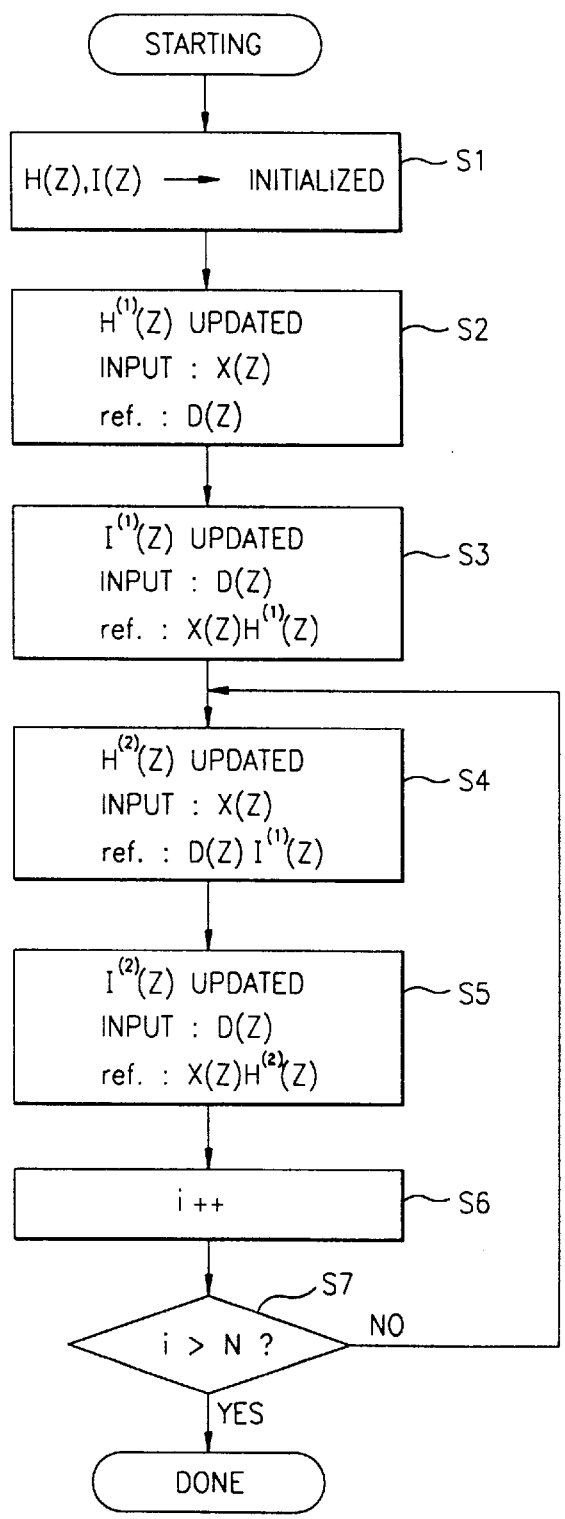
FIG. 4 is a flow chart for updating a coefficient of a filter in FIG. 3.

The above procedure will now be describe in detail with reference to FIGS. 3A, 3B and 4.

First, the FIR filter bank H(z) and the IIR filter bank I(z) are initialized.(S1) Here, in a main tap of the FIR filter bank H(z), a gain difference between an inputted GCR line and the given GCR data of a ROM is loaded as a specific value, and in the other taps, zero is loaded, and in the IIR filter bank I(z) one (1) is loaded.

Accordingly, the FIR filter 20 filters a data x(z) having a ghost effect in accordance with a specific value of the FIR filter bank H(z), and the subtractor 21 subtracts an output from the FIR filter 20 from the GCR data which serves as a GCR signal D(z) in accordance with the equation of G(z)=D(z) and I(z)=1 to perform the LMS algorithm. Thereby, the FIR filter bank H(1)(z) is updated. (S2) Here, G(z) represents a data in which D(z) is filtered by I(z).

Then, the operation of updating the coefficient of the FIR filter 20 is stopped, and instead the operation of updating the coefficient of the IIR filter 30 starts.

The IIR filter 30 outputs the GCR data which serves as a GCR signal D(z) since the IIR filter bank I(z) is set as one (1), and the subtractor 31 subtracts an output F(z)=X(z)*H(z), the GCR data which serves as a GCR signal to perform the LMS algorithm. Thereby, the IIR filter bank $I^{(1)}(z)$ is updated. (S3) Here, F(z) is a data in which X(z) is filtered by H(z).

Next, the operation of updating the coefficient of the IIR filter 30 is stopped, and instead the operation of updating the coefficient of the FIR filter 20 starts.

Accordingly as D(z) is filtered by the $I^{(1)}(z)$ obtained in accordance with the equation X(z)*H(z)*D(z)*I(z), $H^{(2)}(z)$ is updated in accordance with the equation $D(z)*I^{(1)}(z)=G(z)$ and X(z).(S4)

Then, when the updating of $H^{(2)}(z)$ is completed, the operation of updating the coefficient of the IIR filter 30 starts again. Accordingly as X(z) is filtered by $H^{(2)}(z)$, $I^{(2)}(z)$ is updated by using $X(z)*H^{(2)}(z)=F(z)$ and D(z).

Then, if the updated coefficient values of $H^{(3)}(z)$, $I^{(3)}(z)$, $H^{(4)}(z)$, $I^{(4)}(z)$, ..., $H^{(n)}(z)$, $I^{(n)}(z)$ are obtained by alternately repeating the above step(S6), $H^{(n)}(z)$ and $I^{(n)}(z)$ in which the MSE is minimized are outputted.

When a desired time has elapsed after N times of the above steps are repeated (S7), the step of updating a coefficient is completed, and the obtained coefficient of a filter is transmitted to a filter of a hardware, which is the end of the entire steps.

Each sample, one GCR line, and a plurality of GCR lines are used as units for updating a coefficient of a filter in above each step, but in consideration of the convenience of the embodiment, one GCR line was taken for example in the present invention. Moreover, the present invention is not limited to a ghost effect canceler, it can be adopted in an adaptive equalization using a digital signal processor(DSP).

As described in detail above, the present invention has the effect of enhancing a convergence rate of a coefficient of a filter and a performance of cancelling ghost effects in a system, by alternately updating the transfer functions of an FIR filter and an IIR filter to obtain H(n) (z) and I(n) (z) in which an MSE is minimized in a system using both the FIR filter and the IIR filter.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A method for adaptively configuring digital filters to cancel ghost effects in an image signal processor, the method comprising:

initializing a finite impulse response (FIR) filter bank and an infinite impulse response (IIR) filter bank;
   a) updating coefficients of the FIR filter bank by minimizing an error between data that has a ghost effect and that has been filtered by the FIR filter bank and ghost canceling reference (GCR) data;
   b) filtering said GCR data with said IIR filter to produce IIR filtered data; and
   c) updating coefficients of the IIR filter bank by minimizing an error between said IIR-filtered data and data that has been filtered by the updated FIR filter bank.

2. The method of claim 1, wherein in the first step, in a main tap of the FIR filter bank, a gain difference between an inputted GCR line and the pre-set GCR data of a ROM is loaded as a specific value, and in the other taps, zero is loaded, and in the IIR filter bank one (1) is loaded.

3. The method of claim 1, wherein steps a) and c) are performed off line.

4. The method of claim 1, further comprising repeating said step a) using the updated IIR filter bank of said step c).

5. The method of claim 4, further comprising recursively repeating said steps a) and c) using the updated filter bank provided by the immediately preceding steps c) and a), respectively.

6. In an image processor, a method for adaptively configuring digital filters in an alternating manner to optimally cancel ghost effects, said processor having a finite impulse response (FIR) filter and an Infinite Impulse Response (IIR) filter, the method comprising:

a) filtering ghost-effected data with said FIR filter to produce first FIR-filtered data;
   b) determining a first error between said first FIR-filtered data and initial ghost removal data;
   c) adjusting coefficients of said FIR filter to minimize said first error;
   d) terminating adjustment of said FIR filter coefficients to produce a first updated-FIR filter;
   e) filtering said ghost-effected data with said first updated-FIR filter to produce second FIR-filtered data;
   f) filtering ghost canceling reference (GCR) data with said IIR filter to produce first IIR-filtered data;
   g) determining a second error between said second FIR-filtered data and said first IIR-filtered data;
   h) adjusting coefficients of said IIR filter to minimize said second error; and
   i) terminating adjustment of said IIR filter coefficients to produce a first updated-IIR filter.

7. The method of claim 6, further comprising:
   j) filtering said ghost-effected data with said first updated-FIR filter to produce third FIR-filtered data;

k) determining a third error between said third FIR-filtered data and said GCR data;

l) adjusting coefficients of said first updated-FIR filter to minimize said third error;

m) terminating adjustment of said first updated-FIR filter coefficients to produce a second updated-FIR filter;

n) filtering said ghost-effected data with said second updated-FIR filter to produce fourth FiR-filtered data;

o) filtering said GCR data with said first updated-IIR filter to produce second IIR-filtered data;

p) determining a fourth error between said fourth FIR-filtered data and said second IIR-filtered data;

q) adjusting coefficients of said first updated-IIR filter to minimize said second error; and r) terminating adjustment of said first updated-IIR filter coefficients to produce a second updated-IIR filter.

8. The method of claim 7, wherein said steps j)–m) define FIR filter adjustment and said steps n)–r) define IIR filter adjustment, the method further comprising successively alternating said FIR filter adjustment and said IIR filter adjustment.

9. The method of claim 6, wherein, in said step b), said initial ghost removal data is produced by filtering a set of ghost canceling reference values with said IIR filter where coefficients thereof are set to one.

* * * * *